Jan. 16, 1962 JEAN-CLAUDE HERPIN 3,017,077

DEVICE FOR ADVANCING RECORD CARDS IN RECORD CARD CONTROLLED MACHINES

Filed Feb. 12, 1960 5 Sheets-Sheet 1

Jan. 16, 1962 JEAN-CLAUDE HERPIN 3,017,077

DEVICE FOR ADVANCING RECORD CARDS IN RECORD CARD CONTROLLED MACHINES

Filed Feb. 12, 1960 5 Sheets-Sheet 2

Jan. 16, 1962 JEAN-CLAUDE HERPIN 3,017,077

DEVICE FOR ADVANCING RECORD CARDS IN RECORD CARD CONTROLLED MACHINES

Filed Feb. 12, 1960 5 Sheets-Sheet 4

United States Patent Office 3,017,077

Patented Jan. 16, 1962

3,017,077
DEVICE FOR ADVANCING RECORD CARDS IN RECORD CARD CONTROLLED MACHINES

Jean-Claude Herpin, Paris, France, assignor to Compagnie des Machines Bull (Société Anonyme), Paris, France Filed Feb. 12, 1960, Ser. No. 8,384
Claims priority, application France Feb. 17, 1959
4 Claims. (Cl. 234—128)

Figure 1:
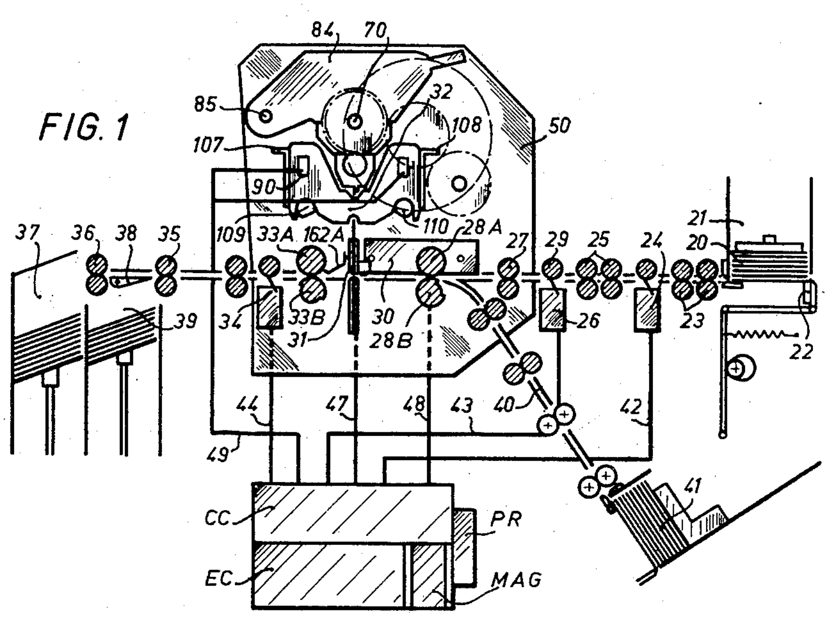

The present invention relates to improvements in devices for punching record cards of the type employed in machines controlled by record cards. The invention is more particularly applicable to the punching devices employed with electronic computer equipment controlled by record cards, for punching the results of computations in the cards themselves by which the data for the computations have been supplied to the computers, or in other cards.

Electronic computer equipments are capable of effecting computations, or series of computations, at constantly increasing speeds and, for correctly utilising the possibilities of such computers, it has become necessary to design means capable of transmitting control indications, computation data and then to record the results of these computations at speeds related to the speed of operation of the computer devices.

Machines are known in which punched cards bearing computation data are successively analysed for transmitting these data to a computer, whereafter the said cards are advanced into a punching device in which they receive the results of the computations in punched form.

For the punching, in these machines, the cards are generally advanced line-by-line under a row of punches either by means of mechanisms comprising Maltese cross gearings or by means of grippers controlled by cams or again by means of toothed rack escapement mechanisms, etc. When they are well designed, such devices can operate satisfactorily at speeds which may reach a hundred cards treated per minute, but they do not readily withstand higher speeds owing to the considerable forces of inertia which are developed by the moving mechanical parts. Improved constructions have been proposed in which the cards are advanced with a continuous movement in the punching device, and in which the punching members, i.e. the punches and the matrices, are actuated with a reciprocating movement in order to be able to effect the punching while accompanying the card in its movement. Mechanisms of this type which are capable of operating correctly in prolonged service at speeds of the order of 300 to 400 cards per minute are very difficult to construct.

"Block" punching devices are also known which perforate in one operation all the selected positions of a card. Such devices, which are very expensive, do not fall within the scope of the invention.

The present invention concerns improvements in punching devices, which make it possible to construct economically machines which are capable of operating at very high speeds and with great reliability.

A punching device designed in accordance with the invention may be controlled with great operating reliability by means of electric pulses, the duration and time position of which permit a relatively wide range of variation.

In a punching device designed in accordance with the invention, the cards are advanced line-by-line under a row of punches by means of a device having a high mechanical output and of economic construction, which operates without shock and does not damage the cards.

Figure 2:
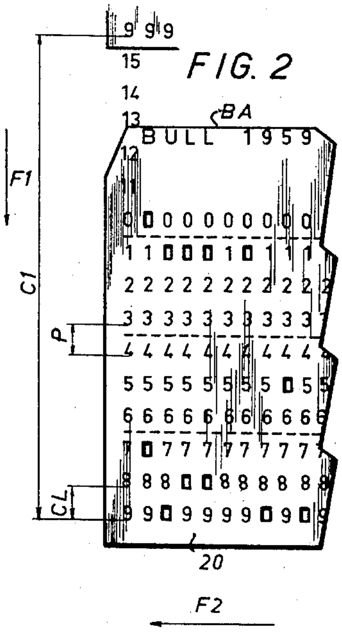
Figure 3:
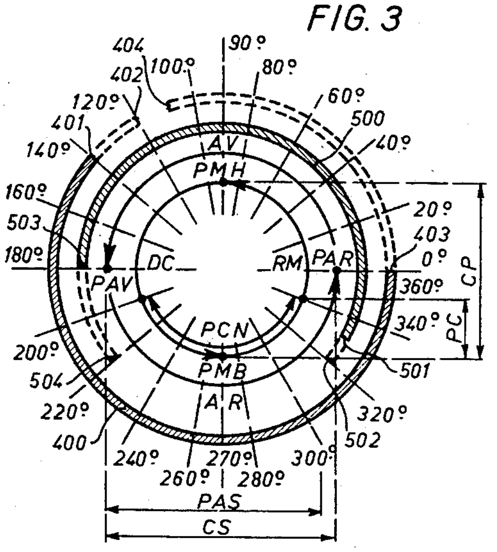
Figure 4:
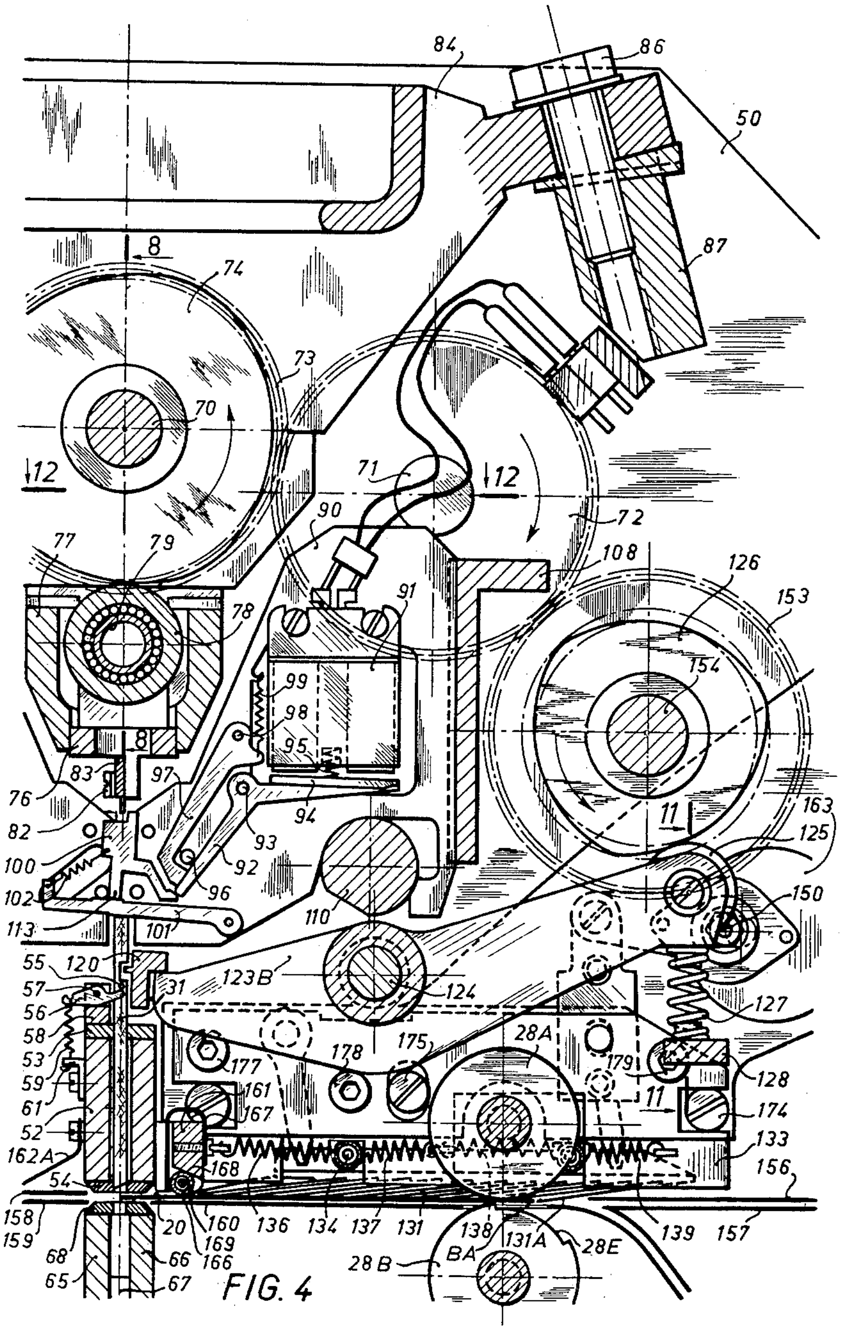
Figure 5:
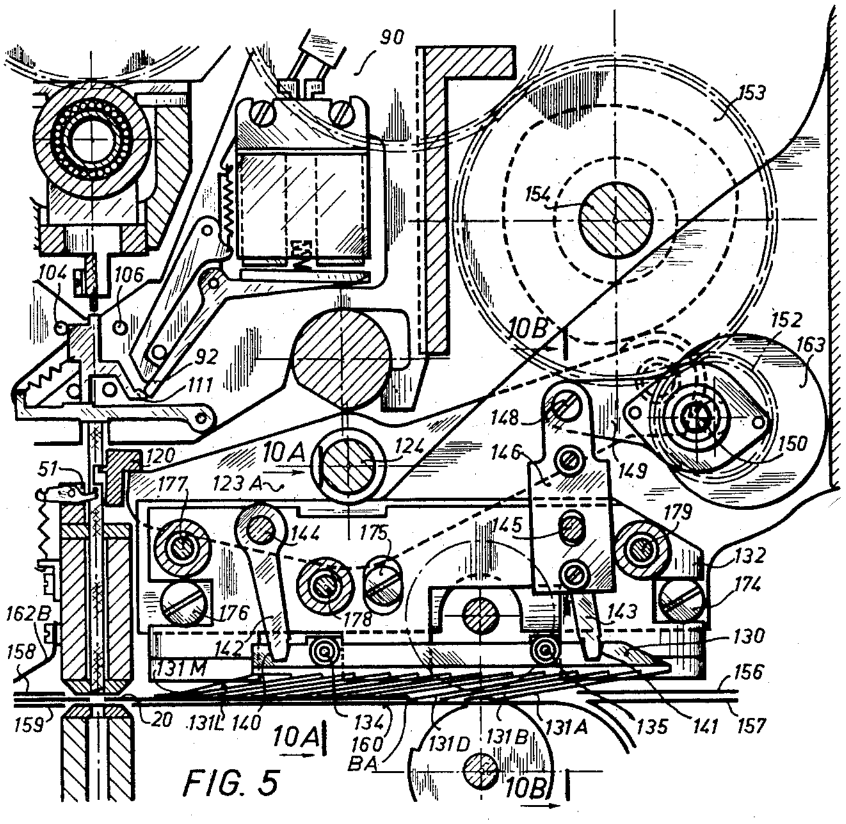
Figure 6A:
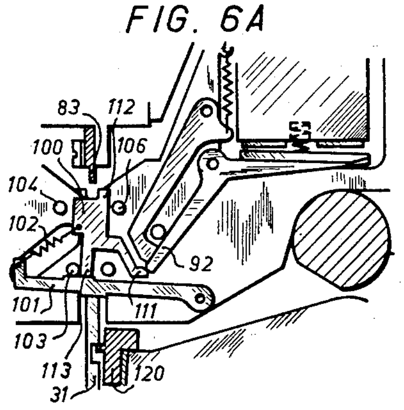
Figure 6B:
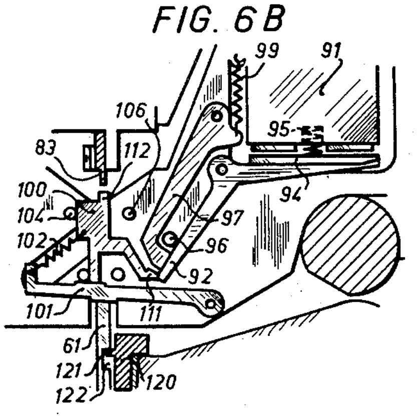
Figure 7:
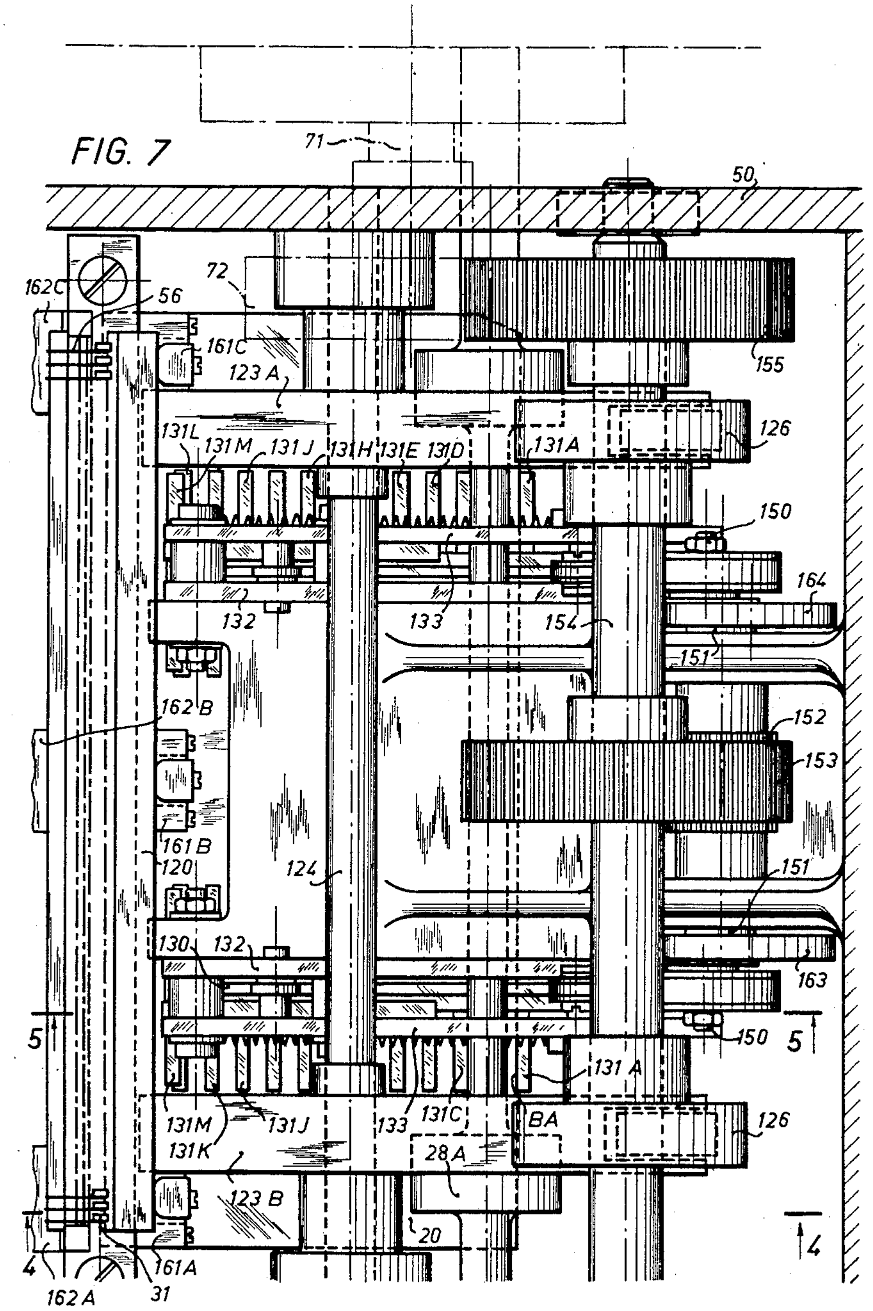
Figure 9B:
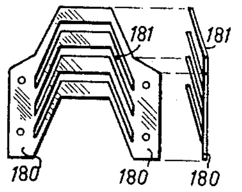
Figure 8:
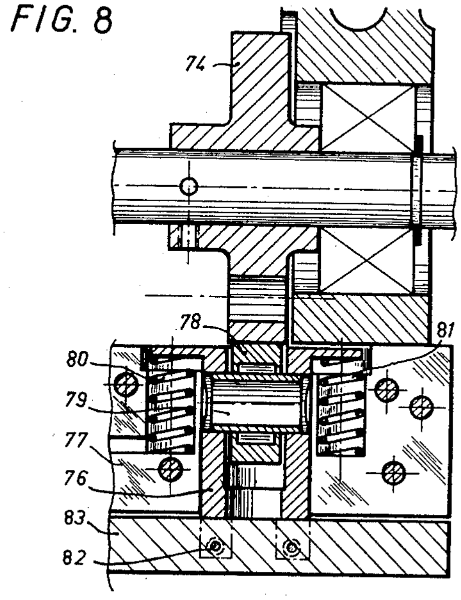
Figure 9A:
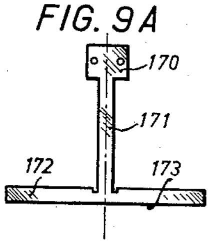
Figure 9C:
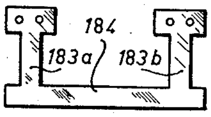
Figure 12:
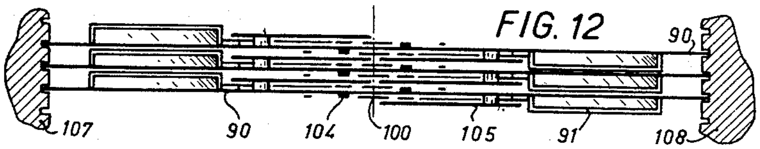
Figure 10A:
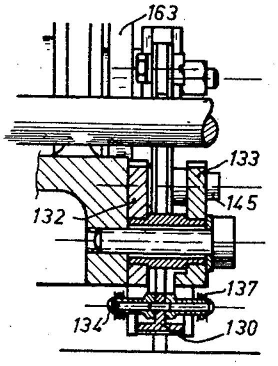
Figure 11:
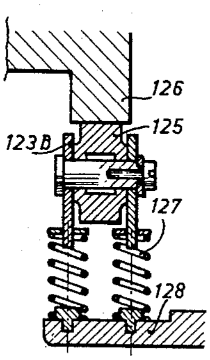
Figure 10B:
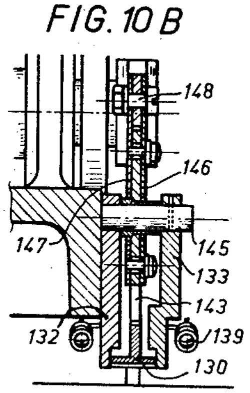

For a better understanding of the invention and to show how it may be carried into effect, the same will now be described, by way of example, with reference to the accompanying drawings, in which:

FIGURE 1 is a diagrammatic view of a record card machine comprising a punching device in accordance with the invention, FIGURE 2 shows a fragment of a record card bearing numerical and alphabetical information punched in accordance with a code, FIGURE 3 is a diagram showing the relative movements of some parts of the machine, FIGURE 4 is a view along the line 4—4 of a part of the mechanism of FIGURE 7, FIGURE 5 is a view along the line 5—5 of a part of the mechanism for the step-by-step feeding and advance of the cards of FIGURE 7, FIGURE 6A is a detail view of a part of the punching mechanism, FIGURE 6B is a detail view of a part of the punching mechanism, FIGURE 7 is a plan view of some parts of the mechanism of FIGURE 4, FIGURE 8 is a sectional view along the line 8—8 of FIGURE 4, FIGURE 9A is a detail view of a blade of the feed mechanism, FIGURE 9B comprises a plan view and a side elevation of another arrangement of the feed blades, FIGURE 9C shows another constructional form of a blade of the type of FIGURE 9A, FIGURE 10A is a sectional view along the line 10A—10A of FIGURE 5, FIGURE 10B is a sectional view along the line 10B—10B of FIGURE 5, FIGURE 11 is a sectional view along the line 11—11 of FIGURE 4, and FIGURE 12 is a fragmentary plan view along the line 12—12 of FIGURE 4.

For the sake of clarity of the drawings and especially of FIGURE 4, the references of some of the parts illustrated have been omitted from some of the figures, but have been included in other figures.

Apart from the means forming the subject of the present invention, a machine designed in accordance with the diagrammatic drawing of FIGURE 1 comprises one or more record card stores, mechanisms for advancing the said cards into the machine, means for analysing the data recorded on the said cards, means for transmitting these data to utilization devices, means for analysing and checking and means for selecting and receiving the record cards treated in the machine. Means of this type are in themselves known in the record card machine art and will not be described in detail.

In the machine of FIGURE 1, record cards 20 are disposed in a card magazine 21, from which they can be extracted one-by-one by a knife-type extracting device 22 of known form. Each extracted card is engaged between driving rollers 23, which pass the card into an analysing device 24. The card thereafter passes through rollers 25, by which it can, if necessary, be temporarily retained, or pushed into a second analysing device 26. On leaving the second analysing device, the card is taken up by rollers 27 and 29 and transmitted to rollers 28A and 28B, which thereafter engage it in a feed mechanism 30 which advances the said card step-by-step under a row of punches 31 of a punching mechanism 32.

On leaving the punching mechanism, the card is taken up by rollers 33A and 33B, which pass it into a third analysing and checking device 34. Rollers 35 and 36 finally deposit the treated cards in a receptacle 37. Some of the cards may be deflected by a flap 38 to a compartment 39 called the selecting compartment. Cards may also be fed to the punching mechanism by an auxiliary track 40 from a card magazine 41.

The data analysed on record cards by the analysing devices 24, 26 and 34 may be transmitted by groups of conductors 42, 43 and 44 to a co-ordinating computer assembly EC, which comprises storage devices MAG, computing, comparing and checking devices CC and programming devices PR. Indications regarding the relative positioning of the cards in the machine are transmitted by a group of conductors 47 to the checking circuits. Control pulses are transmitted by a group of lines 48 to engaging-and disengaging devices which control the advance of the cards through the machine, while data to be punched in cards are transmitted to the punching device by a group of lines 49.

There will only be described in the following the particular means relative to the punching mechanism 32 (FIGURE 1) and to the mechanism 30 (FIGURE 1) for the step-by-step feeding of the cards into the said mechanism.

FIGURE 2 illustrates a fragment of a record card of known type bearing numerical and alphabetical information recorded in the form of coded perforations.

A punching mechanism designed in accordance with the invention comprises only one row of punches and the data to be punched are transmitted to the said mechanism and punched line-by-line in each card. When a card is fed into the punching mechanism, in the direction of the arrow F1 (FIGURE 2), all the perforations to be punched, for example along the horizontal line 9 of the card, are simultaneously punched, whereafter the perforations of the line 8 are punched, then those of the line 7, and so on up to the line 12, or vice versa, depending upon the direction in which the cards are fed through the machine. It is obvious that the arrangements hereinafter described are also applicable to a machine designed, for example, to punch cards fed into the machine column-by-column in the direction of the arrow F2 (FIGURE 2) or vice versa.

The punching mechanism is mounted (FIGURES 1, 4, 5 and 7) in a frame 50 fast with the frame of the machine.

The mechanism comprises in principle:

(*a*) Punching members (punches, punch guides and matrices)
(*b*) A punch actuating mechanism (punching bar and cams actuating the said bar)
(*c*) Members for triggering the punching (interposing mechanisms and triggering electromagnets)
(*d*) A mechanism for raising the punches (raising bar, levers and cams)
(*e*) A mechanism for the step-by-step feed advance of the cards into the punching mechanism (card feeding blades, levers and actuating eccentrics)
(*f*) Members for introducing and discharging the cards (driving rollers)
(*g*) Members for driving the mechanisms (motors, transmissions, clutches, etc.).

For punching record cards having 80 columns, for example, the punching members comprise (FIGURE 4) a row of 80 punches 31 disposed in line in known manner and guided in a punch guide 52 which comprises an upper guide plate 53 and a lower guide plate 54, the said plates being fixed to the said punch guide. Each punch is provided with a finger 55 against which there bears a lever 56 which is adapted to pivot about a pin 57 maintained by a bar 58 formed with notches 51 (FIGURE 5), in which each raising lever is guided. The said levers are arranged to retain each a punch in its uppermost position under the action of a spring 59 which is engaged at one end with the said lever and at the other end with a bar 61 fixed to the punch guide 52. For the punching, each punch may be engaged in a matrix plate 68 supported by two parallel fixed plates 65 and 66 connected together by cross members 67. The mechanism for actuating the punches comprises a shaft 70 (FIGURES 1 and 4) driven by a driving motor 71 (FIGURES 4 and 7) through gearings 72 and 73. Symmetrically mounted on the shaft 70 are two depresser cams 74 (FIGURES 4 and 8). Each depresser cam acts on a push rod 76 adapted to slide in a fixed support 77. Each push rod is provided with a roller 78 which rolls on the cam 74 while turning about a pin 79 and the said roller is maintained in contact with the cam by springs 80 and 81 acting on the said push rod.

A depresser bar 83 is fixed to the push rods 76 by screws 82. The depresser bar can act selectively on all of the punches of the punching mechanism through positionable members hereinafter called interposable members, by means of which the actuation of the punches can be controlled. The assembly comprising the depresser mechanism, cams, push rods and bar is mounted on a block 84 adapted to pivot about a pin 85 (FIGURE 1). The block 84 is maintained in position during operation (FIGURE 4) by screws 86 screwed into a bar 87 fast with the frame of the machine.

Interposing mechanisms are assembled in pairs (FIGURE 12) on support plates 90. Each interposing mechanism comprises (FIGURE 4) an electromagnet 91 and a locking lever 92 fast with a magnetic blade 94 adapted to pivot about a pin 93.

The blade 94 is spaced apart from the pole pieces of the electromagnet by a spring 95 which applies the lever 92 against a fixed abutment 96. A lever 97, called a dynamic abutment, can pivot about a pin 98 and is applied against the lever 92 by a spring 99. An interposable member 100 is urged by a dog 113 against a re-cocking lever 101 under the action of a spring 102 which is engaged at one end with the said interposable member and at the other end with the re-cocking lever. The spring 102 also urges the interposable member 100 permanently against a fixed abutment 103 and towards a second fixed abutment 104 (FIGURE 6A). The interposable member is provided with an arm 111 adapted to engage the lever 92, and with a head 112 on which there acts a depresser bar 83. A counter-plate 105 (FIGURE 12), which is assumed to have been removed in FIGURES 4, 5, 6A and 6B, guides the movable members of the interposing mechanism in a plane. The support plates 90 of the interposing mechanisms are maintained in position in the punching device by means of grooved supports 107 and 108 (FIGURES 1, 4 and 12) which are fast with the frame of the machine. The support plates 90 of the interposing mechanisms are centered in the punching mechanism by bars 109 and 110 (FIGURES 1 and 4) supported by the frame of the machine and each adapted to be turned about its axis in order to lock in position the support plates of the interposing mechanisms. The support plates of the various interposing mechanisms are disposed relative to one another in the punching mechanism as partly indicated in FIGURE 12. For the punching of the cards, punches are selectively lowered into matrices in the matrix plate 68 by the movement of the depresser bar 83 and through appropriately positioned interposable members. The punches which have been depressed are extracted from the matrices by a punch raising mechanism which comprises an extraction bar 120. The punches are maintained outside the matrices by raising levers 56. The extraction bar 120 (FIGURES 4, 5 and 7) is provided with a tongue 121 which is engaged (FIGURE 6B) in a slot 122 formed in the upper part of each punch. The bar 120 is fixed to one end of two levers 123A and 123B which are adapted to rock about a fixed pin 124. The other end of each of the said levers is provided with a roller 125 which is applied (FIGURES 4 and 11) against an extraction cam 126 by means of springs 127 bearing against a fixed support 128.

The mechanism for the step-by-step advance of the cards in the punching mechanism consists (FIGURE 7)

of two symmetrically disposed mechanical assemblies mechanically coupled together by a common driving shaft. Each assembly comprises (FIGURE 5) a blade support 130 which supports flexible blades 131, called feed blades. The feed blades are flexible blades which can be designed in various forms. In the described example, the blades are separate blades of the type illustrated in FIGURE 9A. In this figure, the part 170 of each blade has the same width as the blade support and is formed with two holes for securing the said blade to the blade support by two rivets (or by other means). The relatively narrow portion 171 is flexible and is readily deformable by bending and if desired by torsion. The portion 172 bearing against the cards or pushing them at one edge is relatively wide and rigid. The forward edge 173 is carefully trued. The relatively great width of this edge is designed to reduce the pressure exerted per unit surface area on the rear edge of the cards which are pushed, in order to avoid damage thereto.

FIGURE 9B shows in plan view and in side elevation a constructional form of feed blades, in which blades are formed in groups of four by cutting and bending a flexible metal sheet. Each group of blades can be fixed to a movable support by two plane portions 180. The portions 181 are bent as shown in the side elevation.

FIGURE 9C shows a constructional form of a guide blade which is a variant of the form illustrated in FIGURE 9A and in which two flexible portions 183*a* and 183*b* are provided to ensure that the ends of the straight portion 184 are satisfactorily applied against the cards.

In FIGURES 4, 5, 7, 10A and 10B, each blade support 130 is guided between two fixed blades 132 and 133 (the analogous members in the symmetrically disposed mechanisms (FIGURE 7) bear the same references). Each blade support is provided with two transverse bars 134 and 135 (FIGURES 4, 5 and 10A) by which it is suspended on each side to the plates 132 and 133 with the aid of springs 136, 137, 138 and 139 (FIGURES 4, 10A and 10B). Each blade support is formed (FIGURE 5) with two notches 140 and 141 in which are engaged two rocking levers 142 and 143. The said levers are adapted to rock about two fixed pins 144 and 145 respectively. The lever 143 is fixed (FIGURES 5 and 10B) between two plates 146 and 147 which are jointed by a pin 148 to an eccentric connecting rod 149. The position of the movement of the feed blades in relation to the line of the punches is adjustable by means of an eccentric screw 175, by means of which the position of the feed mechanism in relation to the said line can be adjusted. Eccentric screws 176 and 174 (FIGURE 5) permit of adjusting the vertical position of the device and of thus adjusting the pressure of the feed blades on the cards. Screws 177, 178 and 179 are provided to lock the device in the chosen position. The eccentric of each feed mechanism is driven by an eccentric crank pin 150 (FIGURES 5 and 7) fast with a shaft 151 and provided with a pinion 152 which meshes with a toothed wheel 153.

Balancing masses 163 and 164 (FIGURES 4, 5 and 7) are keyed on the shaft 151 to balance at least partially the reactions produced in the mechanism by the reciprocating devices comprising eccentrics. The toothed wheel 153 is keyed on a shaft 154 on which are mounted the extraction cams 126. The said shaft is driven by the motor 71 through a toothed wheel 155 meshing with the toothed wheel 72 keyed on the shaft of the motor. The position in which the plates 146 and 147 are fixed on the rocking lever 143 may be modified (FIGURES 5 and 10B) to vary the distance between the fixed pin 145 and the pin 148 of the connecting rod 149, in order to adjust the amplitude of the reciprocating movement of the blade support 130.

The card feed rollers 27 and 29, 28A and 28B, 33A and 33B and the contact roller of the analysing device 34 are driven by a separate motor or by the motor 71 through clutches (not shown) controlled in known manner by the checking circuits of the machine. The record cards are fed into the machine between guide plates 156, 157, 158 and 159 and are applied by the step-by-step feed mechanism during the punching against a guide plate 160 by the feed blades 131 (131A to 131L, FIGURES 4, 5 and 7).

Non-return devices 161A, 161B and 161C (FIGURE 7) operate with a wedging action and are arranged to prevent the cards from being carried back after having been pushed forwards by the feed blades. These devices are fixed on the punch guide 52. FIGURE 4 illustrates in section a non-return device in which a hollow roller 166 is pushed by a resilient blade 167 against an inclined surface 168 formed in the support 161 of the device. A small pin 169 retains the roller 166 in the device, but allows it sufficient freedom of movement for the good operation of the device.

A non-return device may be provided in the form of a device comprising blades and similar to a feed device, but fixed, the card being retained in the advanced position by each of the fixed blades of the device in succession.

At the end of each feed movement, when the cards have been advanced for punching the last lines, they would no longer be sufficiently braked by the last feed blades still bearing on the said cards. Additional braking blades 162A, 162B and 162C (FIGURES 1, 4, 5 and 7) are fixed to the punch guide 52 to ensure sufficient braking of the cards by bearing on them at the passage of the last record lines through the punching device.

When the motor of the machine has been started and the roller devices ensuring the feeding of the cards through the machine have been set in operation, cards can be advanced into the machine at the rate of one card per machine cycle (card cycle). The duration of a card cycle C1 (FIGURE 2) is generally the time between the passage of one record line of a card (line 9, for example) and the passage of the same record line of the following card under the punches of the device, for example. The time between the passage of one record line (line 9) and the passage of the succeeding line (line 8) of the same card under the punches is called the line cycle CL. In the described machine, a card cycle is divided into 15 line cycles, or cycle points. The pitch of the card (P, FIGURE 2) is the distance on the card from one record line to the succeeding line (6.35 mm.). Thus, the mechanism for the step-by-step feeding of the cards into the punching mechanism and the mechanisms for actuating the punches operate in step with the line cycles.

A card 20 extracted from the magazine 21 having been fed (FIGURE 1) to the rollers 27 and 29 of the punching device, these rollers engage the said card between the rollers 28A and 28B, which feed it to the position illustrated in FIGURE 4. At this instant, the support of the feed blades is in the extreme (right-hand) position of its return movement and the forward edge (173, FIGURE 9) of the blade 131A (FIGURES 4 and 7) of the feed mechanism is positioned to the rear of the rear edge BA of the card 20. The roller 28B is actuated, like the roller 28A, with a continuous rotational movement. It is formed with a notch 28E (FIGURE 4), due to which the card 20 is no longer gripped between the said rollers when the roller has passed beyond the position illustrated. Since the blade supports are actuated by means of eccentric connecting rods, the feed blades are actuated with a sinusoidal reciprocating movement. In the diagram of FIGURE 3, the stroke CS of the feed blades is shown slightly greater than the pitch PAS of the lines of the card. Each blade support is provided with 12 blades 131A, 131B, 131C . . . 131L which are positioned relative to one another at the pitch P of the lines of the card. An additional blade (counter-blade 131M, FIGURE 7) which is shorter than the others, is disposed above and slightly in front of the last blade (131L) in order that when the blade 131L pushes a card the rear edge of the said card may be maintained by the blade 131M against the forward edge (173) of the said blade.

The shaft 151 (FIGURE 7) turns at the rate of one revolution per line cycle and, during the rotation from 0° to 180° of the said shaft (diagram of FIGURE 3), the blade support carries out a movement from the rear position PAR to the position PAV through a distance CS, during which the card 20 engaged in the mechanism is advanced by this distance to bring the first record line of the card (line 9) under the line of punches. During the remainder of the rotation (from 180° to 360°) of the shaft 151, the blade support carries out a movement from the forward position PAV to the rear position PAR, at the end of which the blade 131B is positioned behind the rear edge BA (FIGURE 2) of the card, which is thereafter advanced, in the course of the succeeding line cycles, by one line by each of the feed blades of each mechanism in succession. The card is advanced by being pushed at its end by a feed blade, while the succeeding blade vertically exerts on the rear portion of the card a pressure which applies the said card against the guide plate 160 and positions the said rear edge of the card in alignment with the blade which is pushing it.

A punching operation can be carried out in each record line of the card during the return stroke AR of the blade supports. For the punching in the last line (line 12) of a card, the card is advanced by the last blade 131L of the feed device and engaged between the rollers 33A and 33B (FIGURE 1). The roller 33B is, like the roller 28B, formed with a recess which prevents driving of the card as long as the latter is positioned in the said recess. After a punching operation in the last line, if any, the card is gripped between the rollers 33A and 33B (FIGURE 1), which take it up and transfer it to the analysing and checking device 34 and, by means of the rollers 35 and 36, to the receptacle 37 or sorted into the compartment 39 by the flap 38.

The springs 136, 137, 138 and 139 which are engaged on either side of the blade supports (FIGURES 4, 7, 10A and 10B) are so designed that the natural period of oscillation of each movable assembly comprising blade supports 130, levers 142 and 143 and plates 146, when it is disengaged from the eccentric connecting rod 149 is as close as possible to the frequency at which the said movable assembly is driven by the said eccentric connecting rod during the operation of the machine. Under these conditions, the driving mechanism has to supply to the feeding mechanism only the energy necessary for sustaining the said oscillation.

The punching mechanism is actuated synchronously with the mechanism for the step-by-step advance of the cards, that is to say, in the rhythm of the like cycles (this rhythm is determined by the depresser cams 74 and the extraction cams 126 of the punches). These cams impart to the mechanism which they control substantially sinusoidal reciprocating movements (FIGURE 3). For practical reasons, the profiles of the cams are so designed as slightly to prolong the position of the members in the upper dead-centre position and slightly to reduce the period in the lower dead-centre position. It has been seen that the depresser bar 83 and the extraction bar 120 are continuously actuated with this reciprocating movement. For reasons which will hereinafter become apparent, the movement of the depresser bar 83 has a slightly greater amplitude than the movement of the extraction bar 120. The shafts 154 and 70 of the cams rotate at a speed which is one-third of the speed of rotation of the shaft 151 actuating the feed mechanisms. The said cams are therefore each provided with three bosses. However, in order to simplify the explanations, it will be assumed, with reference to the diagram of FIGURE 3, that the action of the said cams is comparable, in regard to the depresser bar and the extraction bar of the punches, to the action of a simple eccentric mechanism rotating at a speed three times as high as the speed of rotation of the said cams. Under these conditions, when the step-by-step card feed mechanism is in the rear position (FIGURE 3, PAR, angle 0), the depresser and extraction bars of the punches are at a point mid-way along the upward stroke RM. When the bars are in the upper dead-centre position (PMH, angle 90°), the step-by-step card feed mechanism is at a point mid-way of the feed stroke AV. When the feed mechanism is in the forward position (PAV, angle 180°), the bars are at a point mid-way of the downstroke DC. When the bars are at the lower dead-centre position (PMB, angle 270°), the feed mechanism is at a point mid-way of the return stroke and when this mechanism is in the rear position (PAR, angle 360°, 0°), the bars are at a point mid-way of the upward stroke RM. In the diagram, the positions of the parts of the mechanism have been defined with reference to angular indications. In fact, in the example described, the stroke CS of the feed mechanism is adjusted to 6.6 millimetres for the step-by-step advance of cards having a line pitch of 6.35 millimetres. The depresser and extraction bars of the punches can impart to the latter a total stroke of about 2.2 millimetres, while the punching stroke PC which can be performed by the lower end of a punch outside the punch guide 52 is about 0.8 millimetre and corresponds (FIGURE 3) to an angle PCN of about 140°.

In FIGURE 6A, an interposable device is shown in the disengaged position, that is to say, in the inoperative position with the bars 83 and 120 at the higher dead-centre position. The interposable member 100 is drawn to the left by the spring 102 and bears by its dog 113 on the re-cocking lever 101 and on the fixed abutment 103. The locking lever 92 is in the inoperative position and retains the arm 111 of the interposable member 100. The bars 83 and 120 can rise and descend together in the mechanism without any action on the interposable member 100 or on the corresponding punch.

In FIGURE 4, the interposable member is shown in the inoperative position (not-disengaged) and the bars 83 and 120 move from the bottom upwards (mid-stroke) without action on the interposable member and therefore without action on the punch. The punch 31 is maintained in the upper position under the action of the raising lever 56.

In FIGURE 6B, the electromagnet 91 has been energized, the blade 94 attracted and the arm 111 of the interposable member disengaged from the lever 92 to control the punching of a perforation in a card line. Under the action of the spring 102, the upper portion of the interposable member has been brought into contact with the fixed abutment 104 and the head 112 of the interposable member has taken up a position in the path travelled by the punching bar 83. The punching bar and the raising bar being in the upper dead-centre position (FIGURE 6B), a space will be seen between the punching bar 83 and the head 112 of the interposable member. It has been stated that the stroke of the punching bar is greater than the stroke of the raising bar, so that in the lower dead-centre position the interposable member 100, the re-cocking lever 101 and the head 61 of the punch are maintained narrowly between the punching bar 83 and the tongue 121 of the raising bar 120. If a card is stopped at this instant below the line of punches, the punch descends and passes through the card, thus forming a perforation therein, under the conditions indicated in the diagram of FIGURE 3. The bar 120 thereafter raises the punch, the re-cocking lever and the interposable member. During the upward stroke of the punch and of the interposable member, the arm 111 of the latter abuts (FIGURE 5) the locking lever 92, which has returned against its abutment 96 after de-energization of the electromagnet 91. During the remainder of the upward movement, the arm 111 being retained by the lever 92, the interposable member rocks (to the right) and the head of the said member is positioned outside the path of the punching bar as indicated in FIGURE 6A.

The speed of three hundred cards treated per minute with 15 line cycles per card corresponds to 75 line cycles per second and, at a speed of 400 cards per minute, the punching device operates at a rate of 100 punching cycles per second. At these speeds, the rebounds of the members and more especially of the blade 94 of the electromagnet and of the lever 92 on the fixed abutment 96 might cause disturbances in the operation of the mechanism and, for example, the arm 111 of the interposable member might not be correctly engaged by the lever 92 in the course of the upward movement if the said lever were in the process of rebounding on its abutment. It is to be noted, in fact, that the electromagnet not only controls the positioning of the interposable member under the punching bar by the actuation of the lever 92, but that the latter must have returned to its inoperative position at the instant when the interposable member is raised by the bar 120. In the inoperative condition, the dynamic abutment 97 bears, under the action of the spring 99, against the inoperative lever 92. When the lever 92 is shifted by the attraction of the electromagnet 91 on the blade 94, the dynamic abutment 97 bears against the fixed abutment 96. Since the energization of the electromagnet is thereafter interrupted, the lever 92 is returned towards its abutment 96 under the action of the spring 95. In this movement, the lever 92 first encounters the free end of the dynamic abutment 97, to which it transmits the greater part of its energy, whereafter it bears against the fixed abutment 96. Under the impact of the lever 92, the dynamic abutment is thrown against the fixed abutment 106 which absorbs, by impact, a part of its energy, and then returns into contact with the lever 92 with such weak energy that the disturbance ceases.

The interposing mechanism, the punching bar and the triggering device are designed to constitute a so-called "mechanical storage device," that is to say, that within the limits which are illustrated by the diagram of FIGURE 3 for the described example, the electric pulse necessary for triggering a punching operation may be sent to the said device well before the instant at which the punch is to be actuated and within relatively wide time limits in a punching cycle. These arrangements contribute to ensuring high operating reliability of the device at high speeds without requiring excessive precision in the synchronisation of the control electric pulses.

In the diagram of FIGURE 3, the curve 400 shows at which instants in a cycle a control pulse can be introduced into the winding of a triggering electromagnet, and the curve 500 shows at which instants the said pulse can finish. There will now be described the regulation of the pulses in time, which is suitable for a static operation or for a dynamic operation. The term "static operation" means the operation of the machine at a very reduced speed, for example when the machine is manually driven for checking certain adjustments, while the term "dynamic operation" means operation, for example, at 4,500 line punching cycles per minute. In the latter case, account is taken of the inertia of the mechanical members and of the response time (operating lag) of the electromagnet. The curve 400 indicates, at the point 401 (140°), the earliest instant in a cycle when a control pulse can be sent into an electromagnet when the machine is driven at low speed, while in dynamic operation, for example, at 75 cycles per second, the pulse could commence 20° earlier (point 402), taking into account the response time of the electromagnet. This point corresponds to the instants when, in a cycle, the punching bar has descended sufficiently to prevent the interposable member, if it is released at this instant, from being positioned below the said bar. In this case, the head 112 of the interposable member abuts the side of the bar 83 which can descend fully without acting on the said interposable member and then rise again. However, since the interposable member is disengaged from the lever 92, as soon as the punching bar has risen sufficiently, the interposable member takes up a position under the bar under the action of the spring 102 to actuate the punch at the next descent of the said bar. In dynamic operation, the control pulse must commence at the latest at the point 403, taking into consideration the response time of the electromagnet, but if the machine is manually actuated the pulse can commence much later up to the point 404 when the interposable member, disengaged by the energization of the electromagnet, can still pass under the punching bar to actuate the punch immediately. In the diagram of FIGURE 3, the space 404 to 401 corresponds to the time considered necessary, with a safety margin, between the instant 404 when the triggering of the electromagnet (in static operation) still enables the interposable member to position itself below the punching bar which has commenced to descend, and the instant 401 when the triggering of the electromagnet can take place without risk of the interposable member being positioned below the said bar, but only bears against it so as to become automatically engaged below it as soon as the said bar has risen sufficiently, as just described.

The point 403 corresponding to the last instant when a pulse in dynamic operation can commence seems at first sight to be excessively early, but in fact, in dynamic operation, the minimum duration of a control pulse which permits of correctly actuating the electromagnet corresponds to about 60°. Under these conditions, the point 403 has been chosen to ensure reliable operation of the device.

The curve 500 of the diagram of FIGURE 3 indicates the instants when a control pulse fed into a triggering electromagnet can end. The point 501 indicates the first instant of the end of a pulse in static operation, and the point 502 indicates the first instant of the end of a pulse in dynamic operation.

The point 503 indicates the last instant when, in dynamic operation, the pulse must cease in order to ensure correct re-engagement of the arm 111 of the interposable member with the lever 92 in the upward movement of the bars, while this point must be shifted to the point 504 in static operation. The above indications, which correspond to a concrete example of the embodiment of the invention, show the great flexibility of operation of the device and show that it is simple to provide for an adjustment of the pulses in time and in duration which is suitable both for static operation and for dynamic operation at speeds of from 300 to 400 cards per minute.

After the punching (if any) of perforations in the last line of a card, the latter, which is pushed by the last bar (131L) of the step-by-step feed mechanisms, is engaged between the rollers 33A and 33B (FIGURE 1). The roller 33B is formed with a recess which permits of engaging the card between the rollers without its being immediately driven, whereafter it is gripped and carried along under the analysing and checking device 34 and carried by the rollers into a receptacle.

The described devices, when they are correctly designed, cause absolutely no damage to the cards. Thus, record cards have been passed several hundreds of times through a feed device designed in accordance with the invention without showing any appreciable deterioration.

It is obvious that the described example is in no way limitative, that the described arrangements may be used alone or in combination, and that any modifications and adaptations may be made in accordance with circumstances and applications without departing from the spirit of the invention.

I claim:

1. In a machine operating with record cards, means for advancing the cards step-by-step to a succession of equally spaced positions comprising a fixed guide plate, at least one movable support, means for actuating the said support with a reciprocating oscillating movement in the direction of advance of the cards, flexible blades disposed parallel to one another and each fixed to said support at one end, the free end of each blade having a rectilinear edge perpendicular to the direction of feed advance of the cards and being applied by flexure of the said blade against the said fixed guide plate disposed parallel to the movement of the support and serving as a path of movement for the cards, the free edges of the blades being staggered relative to one another for successively pushing the rear edge of a record card engaged between the said blades and the guide plate, and retaining means for preventing a card from returning to the rear during the return movement of the support of the push blades.

2. Machine for the step-by-step punching of record cards comprising a row of punches, a fixed plate for guiding the cards, at least one movable support, means for actuating said support with a reciprocating oscillating movement in the direction of feed advance of the cards, flexible blades disposed parallel to one another and each fixed to the said support at one end, the free end of each blade having a rectilinear edge perpendicular to the direction of feed advance of the cards and being applied by flexure of the said blade against the said fixed guide plate disposed parallel to the movement of the support and serving as a path of movement for the said cards, the free edgs of the blades being staggered relative to one another for successively pushing the rear edge of a record card engaged between the said blades and the guide plate, retaining means for preventing a card from returning to the rear during the return movement of the blade support, and means for selectively actuating said punches in synchronism with the movement of the said support so as to effect the punching of a perforation in a card while the latter is stopped during the return movement of the support of the push blades.

3. A machine according to claim 1 comprising a flexible counter-blade fixed at one end to said support ahead of the push blades, the free end of said counter-blade having a rectilinear edge perpendicular to the direction of feed advance of the cards and being applied by flexure of said counter-blade against the said fixed guide plate, said counter-blade bearing on the rear portion of a card engaged between the said blades and the guide plate, when said card is pushed forward by the next preceding push blade whereby said counter-blade maintains at least one portion of the rear edge of the said card close to the guide plate in front of the forward edge of said next preceding push blade which then bears against the guide plate during the movement of the support of the said blades in the direction of the feed advance of the card.

4. A machine for the step-by-step punching of record cards comprising a row of punches, a fixed plate for guiding the cards, at least one movable support, means for actuating said support with a reciprocating oscillating movement in the direction of feed advance of the cards, flexible blades disposed parallel to one another and each fixed to said support at one end, the longitudinal cross-section of the assembly of said support and of said blades together taking up a fish backbone shape, the free end of each blade having a rectilinear edge perpendicular to the direction of feed advance of the cards and being applied by flexure of the said blade against the said fixed guide plate, disposed parallel to the movement of the support and serving as a path of movement for said cards, the free edges of the blades being staggered relative to one another for successively pushing the rear edge of a record card engaged between the said blade and the guide plate, spring means connecting each movable support to a fixed portion of the machine, whereby each movable support has a natural period of oscillation, retaining means for preventing a card from returning to the rear during the return movement of the blade support, and means for selectively actuating said punches in synchronism with the movement of said support so as to effect the punching of a perforation in a card while the latter is stopped during the return movement of the support of the push blades.

References Cited in the file of this patent

UNITED STATES PATENTS

| | | |
|---|---|---|
| 1,121,271 | McDonald et al. | Dec. 15, 1914 |
| 2,280,823 | Hansen | Apr. 28, 1942 |
| 2,848,223 | Birchler et al. | Aug. 19, 1958 |